United States Patent [19]

Wang

[11] Patent Number: 4,805,654
[45] Date of Patent: Feb. 21, 1989

[54] SUN SHIELD FOR AUTOMOBILES

[76] Inventor: Kuo-Hsin Wang, 140-77 Che-Lu Chien, Pao-An Vill., Jen-Te Hsiang, Tainan Hsien, Taiwan

[21] Appl. No.: 195,264

[22] Filed: May 18, 1988

[51] Int. Cl.⁴ ........................ E04H 15/06; B60J 7/20; A45B 23/00
[52] U.S. Cl. ...................... 135/88; 135/98; 135/109; 296/136
[58] Field of Search ................ 135/88, 98, 106, 109; 296/95 R, 136

[56] References Cited

U.S. PATENT DOCUMENTS

| 3,044,477 | 7/1962 | Higgins | 135/98 |
| 3,213,868 | 10/1965 | Forbes | 135/98 |
| 3,870,061 | 3/1975 | Lowery | 135/88 |
| 3,957,301 | 5/1976 | Huber | 296/95 R |
| 4,684,165 | 8/1987 | Becker | 296/136 |

FOREIGN PATENT DOCUMENTS 2112638  7/1983  United Kingdom ................ 135/98

Primary Examiner—J. Karl Bell
Attorney, Agent, or Firm—Andrus, Sceales, Starke & Sawall

[57] ABSTRACT

This invention provides a sun shield for automobiles. The sun shield has a collapsible framework for supporting a flexible cloth. The framework has at least three legs radially and isometrically extended from the framework. In the free end of each leg there is a sucker adapted to attach to the roof of an automobile. Therefore, the cloth can be easily mounted above an automobile to shade it from the unpleasant and damaging effects of the sun's rays, and it can also be easily detached from the roof of the automobile and folded into the trunk of the automobile.

4 Claims, 6 Drawing Sheets

SUN SHIELD FOR AUTOMOBILES

BACKGROUND OF THE INVENTION

The present invention relates to a shield for automobiles, and more particularly to a sun shield which can be easily and detachably mounted above the roof of an automobile.

As is well known, the most common type of shield for automobiles is a waterproof cover with elastic straps respectively fixed along its front periphery and rear periphery. It is easily mounted on a car and can be conveniently folded into the trunk. In essence, it is a portable, collapsible garage. This type of shield, however, is not a good sun shield because it entirely envelopes the car and causes the interior temperature to become very uncomfortable when the car is left to sit in the sun.

Some cars have shields fixedly stretched above their roofs. This type of shield comprises cloth stretched over a frame which is permanently fixed to roof. These shields are cumbersome and constitute a wind barrier when the car runs at a high speed. U.S. Pat. No. 3,992,053 provides a sun shield comprising a strip of screening material which is stored on a roller within a cylindrical container attached to the automobile. When in use, the screening material can be drawn out of the container through a slit axially formed in the wall of the container, and can be pulled over the automobile and attached at its free end to the automobile so that the roof is shielded. This type of shield is easily extended over the roof of a car and also easily wound up within the cylindrical container. However, the cylindrical container attached to the automobile constitutes a wind barrier for the car while it is in motion and it adversely affects thhe appearance of the car.

SUMMARY OF INVENTION

Therefore, the object of the present invention is to provide a sun shield which can be easily and detachably mounted on the roof of an automobile to form a canopy whereby the automobile, while stationary, can be shaded from the unpleasant and damaging effects of the sun's rays. In this way the interior of the automobile can be kept at a reasonable temperature, thereby preventing discomfort for the vehicle occupants when the vehicle is entered, and also preventing possible heat damage to upholstery and expensive electrical equipment, such as radios.

Accordingly, the present invention provides a sun shield for automobiles comprising: a main rod, one end portion of which has a joint fixed thereon, the rod having three runners slidably sleeved on the rod, said runners herein being referred to as first runner, second runner and third runner according to their position relative to the joint, between the joint and the second runner having locking means mounted on the rod for detachably locking the first runner; a plurality of main ribs radially extended from the axis of the main rod, each main rib being assembled by at least two sub-units which are slidably and stretchably telescoped on one another, one end of each main rib being hinged in said joint, the other end of the same herein being referred to as a free end; a plurality of auxiliary ribs correspondingly mounted with the main ribs, one end of each auxiliary rib being hinged in said first runner, the other end of the same being hinged in a corresponding main rib; at least three legs isometrically extended from the axis of said main rod, one end of each leg being hinged in said second runner, the other end of the same having a sucker hinged therein; at least three supporting ribs correspondingly mounted with the legs, one end of each supporting rib being hinged in said third runner, the other end of the same being hinged in the corresponding leg; and a flexible cloth disposed over the main ribs which is fixed at its periphery to the free end of said ribs, the size of said cloth being capable of entirely covering the main ribs while the main ribs are in stretched state; whereby the flexible cloth can be easily and collapsibly stretched above a car by moving the runners to stretch the overall framework of the sun shield and using the suckers to securely attach the framework to the roof of the car.

BRIEF DESCRIPTION OF THE DRAWINGS

The present invention is illustrated by way of example in the accompanying drawings, in which.

DETAILED DESCRIPTION OF THE INVENTION

Figure 1:
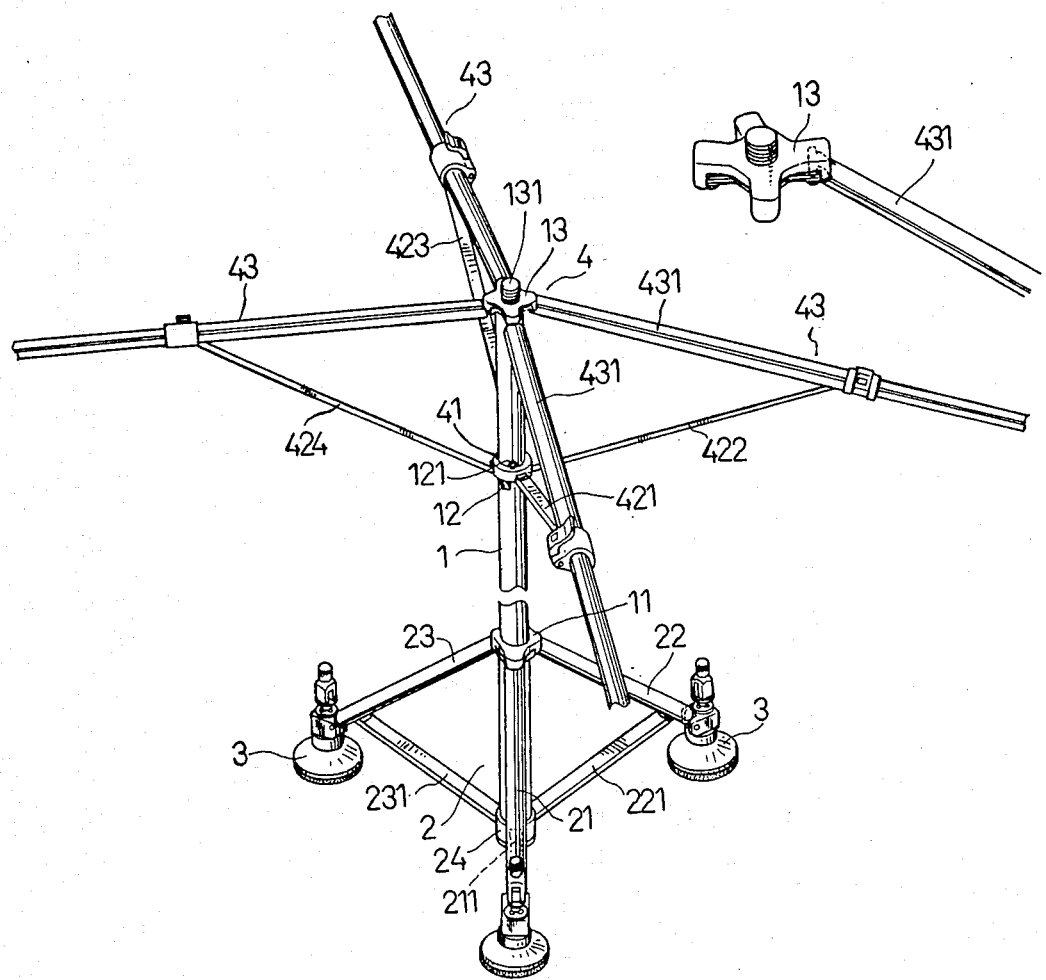
FIG. 1 is a perspective view of the framework of an embodiment according to the present invention.
Figure 2:
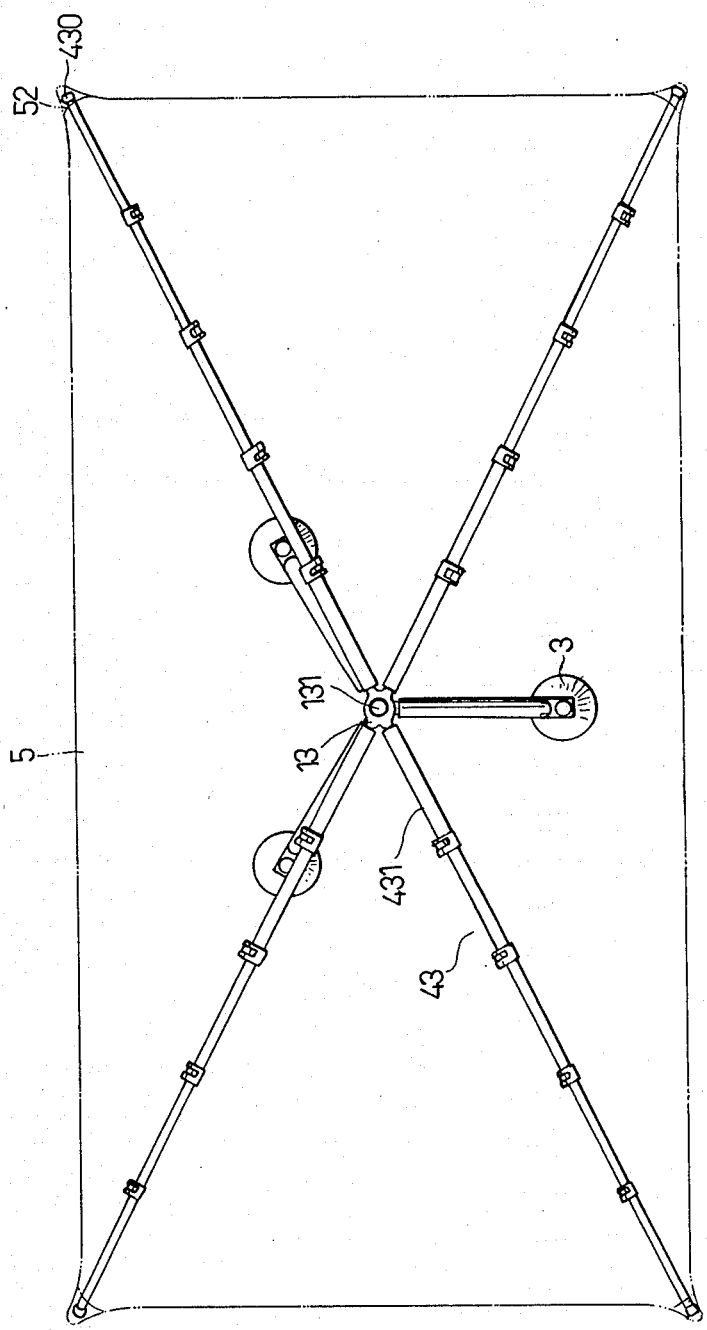
FIG. 2 is a top view of the sun shield according to the present invention.
Figure 3:
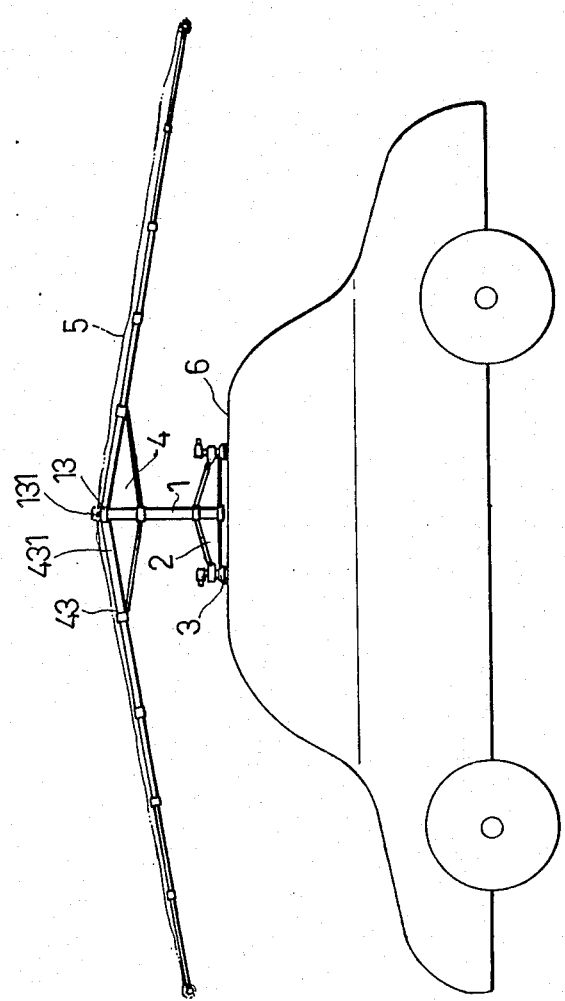
FIG. 3 is a side view of the sun shield stretched above a car.

Referring to FIG. 1, FIG. 2 and FIG. 3, the sun shield according to the present invention comprises a main rod 1. One end portion of the main rod 1 has a joint 13 screwed thereon. Along the main rod 1 are three runners 41, 11, 24 slidably sleeved thereon. Said runners hereinafter are referred to as first runner 41, second runner 11 and third runner 24 according to their position relative to the joint 13. Between the joint 13 and the second runner 11 there is a retrievable inclined plate 12 and a retrievable protrusion 121 mounted on the rod 1 for detachably locking the first runner 41 therebetween. There are four main ribs 43 radially extended from the axis of the main rod 1. Each main rib 43 is assembled by five sub-units 431 which are slidably and stretchably telescoped on one another. One end of each main rib 43 is hinged in said joint 13. The other end of each main rib 43 hereinafter is referred to as free end. The free end has a tip 430 attached thereat. There are four auxiliary ribs 422 correspondingly mounted with the main ribs 43. One end of each auxiliary rib 422 is hinged in said first runner 41. The other end of the same is hinged in the first sub-unit 431 of a corresponding main rib 43. There are three legs 21, 22, 23 isometrically extended from the axis of said main rod 1. One end of each leg 21, 22 or 23 is hinged in said second runner 11. The other end of the same has a sucker 3 hinged therein. There are three supporting ribs 211, 221, 231 correspondingly mounted with the legs 21, 22, 23. One end of each supporting rib 211, 221 or 231 is hinged in said third runner 24. The other end of the same is hinged in the corresponding leg 21, 22 or 23. A flexible rectangular cloth 5 is disposed over the main ribs 43. Each angle portion of said cloth 5 has a sack 52 formed therein. The cloth 5 is fixed over the main ribs 43 by engaging the tips 430 of the main ribs 43 into the sacks 52. The size of said cloth 5 is capable of entirely covering the main ribs 43 while the main ribs 43 are in stretched state. In this way, as shown in FIG. 3, the flexible cloth 5 can be easily stretched above a car by moving the runners 41, 11, 24 to stretch the overall framework of the sun shield and by using the suckers 3 to scurely attach the framework to the roof of the car.

Figure 4:
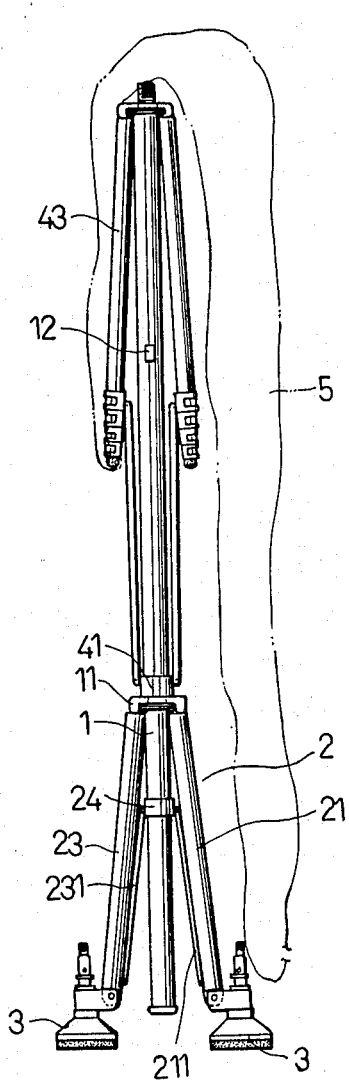
FIG. 4 is a side view of the sun shield which is folded.
Figure 5:
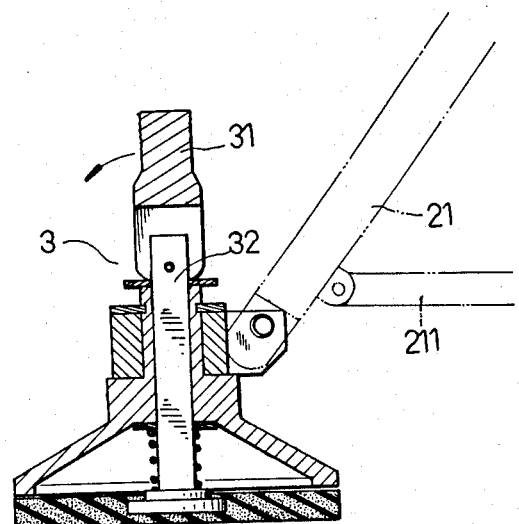
FIG. 5 is a sectional view of the sucker used in the present invention.

Referring to FIG. 5, the above-mentioned sucker 3 can be assembled using a suction mat 33 for adhering to the roof of a car and a retrievable rod 32, one end of which is attached in the central portion of the suction mat 33, the other end of which has a grip 31 attached thereon for pulling the retrievable rod 32 to produce a vacuum between the mat 33 and the surface of the roof of a car. In this way, the sucker 3 can be detached from the roof of a car by downwardly pressing the grip 31 to break the vacuum between the mat 33 and the roof surface of the car. Of course, a screw type by which the suction mat 33 can be upwardly pulled and downwardly pressed and a magnet type which can be made to detachably attract to the roof of a car, and a mixed type having suction mats under the legs and a magnet attached under the main rod are also preferred. As shown in FIG. 4, the sun shield can therefore be easily detached from the roof of a car by pressing the grips 31 to break the vacuum under the suckers 3, and then can be folded by moving the runners 41, 11, 24 to collapse the framework of the sun shield so that the shield can be conveniently placed in the trunk.

Figure 6A:
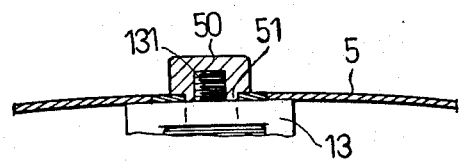
FIG. 6 is a series of sectional views which show different modes for locking the central portion of the flexible cloth at the top of the main rod.
Figure 6B:
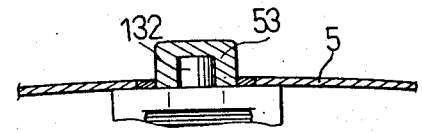
Figure 6C:
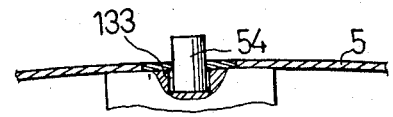

Referring to FIG. 1 and FIG. 6A, there is a hole 51 formed in the central portion of the cloth 5 for being passed through by the top portion 131 of the main rod 1. The top portion 131 of the main rod 1 is formed as a screw by which the central portion of the cloth 5 can be fixed over the joint 13 by means of an internally threaded cap 50. FIG. 6B and FIG. 6C show other modes for fixing the central portion over the joint 13. As shown in FIG. 6B, there is a cap 53 integrally formed on the central portion of the cloth 5. A post 132 formed on the top end of the main rod 1 can be engaged with the cap 53 whereby the central portion of the cloth 5 can be fixed over the joint 131. As shown in FIG. 6C, there is a protrusion 54 formed in the central portion of the cloth 5. A hole 133 formed in the top end of the main rod 1 can be engaged with the protrusion 54 whereby the central portion of the cloth can be fixed over the joint too.

Figure 7:
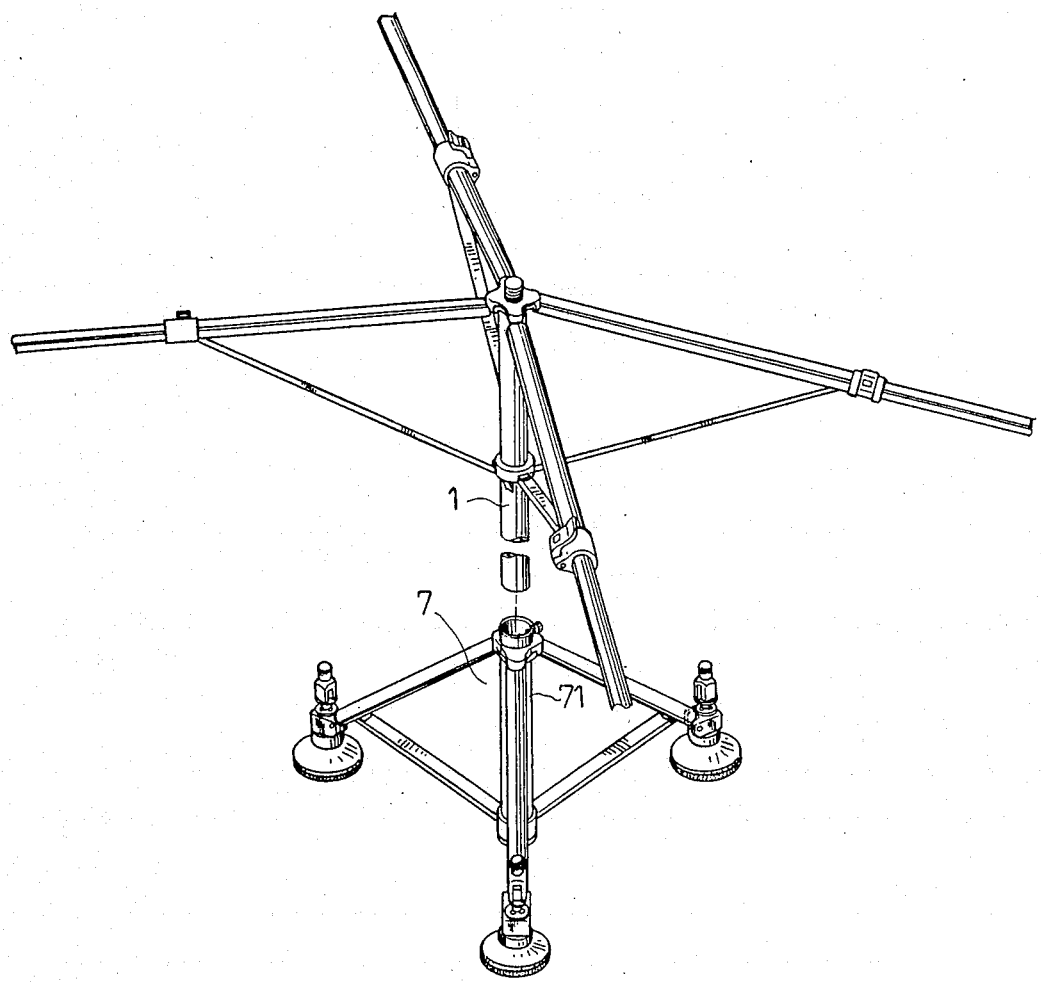
FIG. 7 is a perspective view of another embodiment according to the present invention.

Referring to FIG. 7, the framework of another embodiment is assembled by two sections. The first section comprises the main rod, the main ribs and the auxiliary ribs. In addition to the legs, the supporting ribs and the suckers, the second section 7 further comprises a central hollow post 71 with a locking means by which the main rod of the first section can be slidably telescoped therein and fixed at a desired height. In this way, the overall height can be reduced because the main ribs can be stretched and locked by the retrievable inclined plate 12 and the retrievable protrusion 121 before the first section is installed in the central post 71 of the second first section.

While the invention has been described in connection with what is presently considered to be the most practical and preferred embodiment, it is to be understood that the invention is not to be limited to the disclosed embodiment, but, on the contrary, is intended to cover various modifications and equivalent arrangements included within the spirit and scope of the broadest interpretation so as to encompass all such modifications and equivalent arrangements.

I claim:

1. A sun shield for automobiles comprising: a main rod, one end portion of which has a joint fixed thereon, the rod having three runners slidably sleeved thereon, said runners herein being referred to as first runner, second runner and third runner according to their position relative to the joint, between the joint and the second runner having locking means mounted on the rod for detachably locking the first runner; a plurality of main ribs radially extended from the axis of the main rod, each main rib being assembled from at least two sub-units which are slidably and stretchably telescoped on one another, one end of each main rib being hinged in said joint, the other end of the same herein being referred to as free end; a plurality of auxiliary ribs correspondingly mounted with the main ribs, one end of each auxiliary rib being hinged in said first runner, the other end of the same being hinged in a corresponding main rib; at least three legs isometrically extended from the axis of said main rod, one end of each leg being hinged in said second runner, the other end of the same having a sucker hinged thereon; at least three supporting ribs correspondingly mounted with the legs, one end of each supporting rib being hinged in said third runner, the other end of the same being hinged in the corresponding leg; and a flexible cloth disposed over the main ribs which is fixed at its periphery to the free ends of said main ribs, the size of said cloth being capable of entirely covering the main ribs while the main ribs are in a stretched state.

2. A sun shield as claimed in claim 1, wherein each sucker comprises a suction mat adapted to adhere to the roof surface of an automobile, a retrievable rod, one end of which is fixed in the central portion of the mat, and a grip attached in the other end of the retrievable rod for pulling the central portion of the mat by means of the retrievable rod.

3. A sun shield as claimed in claim 1, wherein each sucker comprises a magnet by which the sun shield can be made to attract to the roof of a car.

4. A sun shield as claimed in claim 1, wherein the main rod comprises an upper portion which is assembled with said main ribs and said auxiliary ribs, and a lower portion which is assembled with said legs and said supporting ribs, said lower portion being formed as a hollow post and said upper portion being slidably telescoped within the lower portion.

* * * * *